United States Patent
Misiaszek et al.

(10) Patent No.: US 12,243,070 B2
(45) Date of Patent: Mar. 4, 2025

(54) CONTEXTUAL RECOMMENDATIONS WITH GRAPHICAL ELEMENTS BASED ON ACTIVITY RECOGNITION

(71) Applicant: Truist Bank, Charlotte, NC (US)

(72) Inventors: Alex Heath Misiaszek, Cornelius, NC (US); Sarah Katherine Nash, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 17/895,626

(22) Filed: Aug. 25, 2022

(65) Prior Publication Data

US 2024/0070710 A1   Feb. 29, 2024

(51) Int. Cl.
*G06Q 30/02* (2023.01)
*G06N 20/00* (2019.01)
*G06Q 30/0207* (2023.01)
*G06Q 30/0234* (2023.01)

(52) U.S. Cl.
CPC ......... *G06Q 30/0234* (2013.01); *G06N 20/00* (2019.01); *G06Q 30/0239* (2013.01)

(58) Field of Classification Search
CPC . G06Q 30/0234; G06Q 30/0239; G06N 20/00
See application file for complete search history.

(56) References Cited

U.S. PATENT DOCUMENTS

| | | | | |
|---|---|---|---|---|
| 11,386,349 | B1 * | 7/2022 | Prisadnikov | G06N 20/00 |
| 11,442,748 | B2 * | 9/2022 | Swindell | G06F 9/451 |
| 2014/0095273 | A1 * | 4/2014 | Tang | G06Q 30/0283 |
| | | | | 705/14.1 |
| 2014/0180787 | A1 * | 6/2014 | Sarkissian | H04L 63/08 |
| | | | | 705/14.49 |
| 2016/0140670 | A1 * | 5/2016 | Gupta | H04W 4/21 |
| | | | | 705/7.29 |
| 2018/0314972 | A1 * | 11/2018 | Swindell | G06N 20/00 |
| 2020/0111121 | A1 * | 4/2020 | Ben-Itzhak | G06F 16/24578 |

OTHER PUBLICATIONS

University of Chicago, Future of Computer in Marketing, Phil Kotler, J. of Marketing vol. 34 Issue 1, pp. 11-14 (Year: 1970).*

* cited by examiner

*Primary Examiner* — Breffni Baggot
(74) *Attorney, Agent, or Firm* — Kilpatrick Townsend & Stockton LLP; Michael A. Springs, Esq.

(57) ABSTRACT

A computer system can automatically populate graphical elements on a user interface. The system can receive sets of information from a plurality of third-party server operators. The system can create, for each set of information, a graphical element for the user interface. The system can collect, via the user interface, a first set of data from a plurality of users. The system can train a machine-learning model to determine at least one pattern in activities using the first set of data. The system can collect, via the user interface, a second set of data from a specific user. The system can apply the machine-learning model to the second set of data to predict a pattern in activities associated with the specific user. The system can automatically populate at least one graphical element for the user interface based on the pattern in activities associated with the specific user.

20 Claims, 4 Drawing Sheets

CONTEXTUAL RECOMMENDATIONS WITH GRAPHICAL ELEMENTS BASED ON ACTIVITY RECOGNITION

TECHNICAL FIELD

The present disclosure relates generally to online user interfaces and, more particularly (although not necessarily exclusively), to automatically populating graphical elements for user interfaces from online activity recognition.

BACKGROUND

The public is increasingly accessing webpages and other on-line portals to perform various activities on-line. Performing such activities on-line provides convenience and potentially new types of services not readily or conveniently available in-person. Such potentially new services include access to superior up-to-the minute information, information filters, and search agents. With the increase in the number of activities performed on-line, new and more powerful methods are being developed for protecting the security of the user. The result is that convenience and enhanced security have combined to make on-line services more useful and effective, thereby driving the development of newer and more integrated services. More sophisticated server operators can provide greater integration and a high degree of user control, which can enable on-line users to synthesize, monitor, and analyze a wide array of activities and personal data.

SUMMARY

A computer system can automatically populate graphical elements on a user interface. For example, a method can include receiving, by the computer system, sets of information from a plurality of third-party server operators. The method can further include creating, for each set of information, a graphical element for the user interface. Additionally, the method can include collecting, via the user interface, a first set of data from a plurality of users. The method can include training a machine-learning model to determine at least one pattern in activities using the first set of data. The method can further include collecting, via the user interface, a second set of data from a specific user. Additionally, the method can include applying the machine-learning model to the second set of data to predict a pattern in activities associated with the specific user. The method can include automatically populating at least one graphical element for the user interface based on the pattern in activities associated with the specific user.

In another example, a computer system can include a processor and a memory that includes instructions executable by the processor for causing the processor to perform operations. The operations can include receiving, by the computer system, sets of information from a plurality of third-party server operators. The operations can further include creating, for each set of information, a graphical element for the user interface. Additionally, the operations can include collecting, via the user interface, a first set of data from a plurality of users. The operations can include training a machine-learning model to determine at least one pattern in activities using the first set of data. The operations can further include collecting, via the user interface, a second set of data from a specific user. Additionally, the operations can include applying the machine-learning model to the second set of data to predict a pattern in activities associated with the specific user. The operations can include automatically populating at least one graphical element for the user interface based on the pattern in activities associated with the specific user.

In an example, a non-transitory computer-readable medium comprising instructions that are executable by a processor for causing the processor to perform operations including receiving, by a computer system, sets of information from a plurality of third-party server operators. The operations can further include creating, for each set of information, a graphical element for the user interface. Additionally, the operations can include collecting, via the user interface, a first set of data from a plurality of users. The operations can include training a machine-learning model to determine at least one pattern in activities using the first set of data. The operations can further include collecting, via the user interface, a second set of data from a specific user. Additionally, the operations can include applying the machine-learning model to the second set of data to predict a pattern in activities associated with the specific user. The operations can include automatically populating at least one graphical element for the user interface based on the pattern in activities associated with the specific user.

BRIEF DESCRIPTION OF THE DRAWINCIS

DETAILED DESCRIPTION

Certain aspects and examples of the present disclosure relate to automatically populating graphical elements on a user interface based on a predicted pattern of activities for a user. A machine-learning (ML) model in a computing device can be used to predict the pattern of activities. For example, a first set of information can be collected from a plurality of users. The machine-learning model can be trained to determine at least one pattern of activities using the first set of data. A second set of information can be collected from the user. The trained machine-learning model can be applied to the second set of information to predict the pattern of activities for the user.

The computing device can automatically populate the user interface with graphical elements based on the predicted pattern of activities. The graphical elements can include contextual recommendations for activities that the user may appreciate. Examples of the graphical elements can include images, internet links, and text. The graphical elements can be selected, spatially positioned, highlighted, or manipulated within the user interface based on the predicted pattern of activities. The computing device can create the graphical elements based on sets of information from a plurality of third-party server operators. In some examples, the graphical elements can relate to activities provided by the server operator associated with the computing device.

Current methods that exist for allowing users to perform on-line activities with a user interface often provide a similar user experience for all users. For example, users may access a digital management service provided by a server operator, but the same experience may be provided to all users and devices regardless of their characteristics. And customizing an on-line experience for a particular user or device can be challenging. But some examples of the present disclosure can overcome one or more of these problems by automatically populating the user interface with graphical elements based on the predicted pattern of activities for the user.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
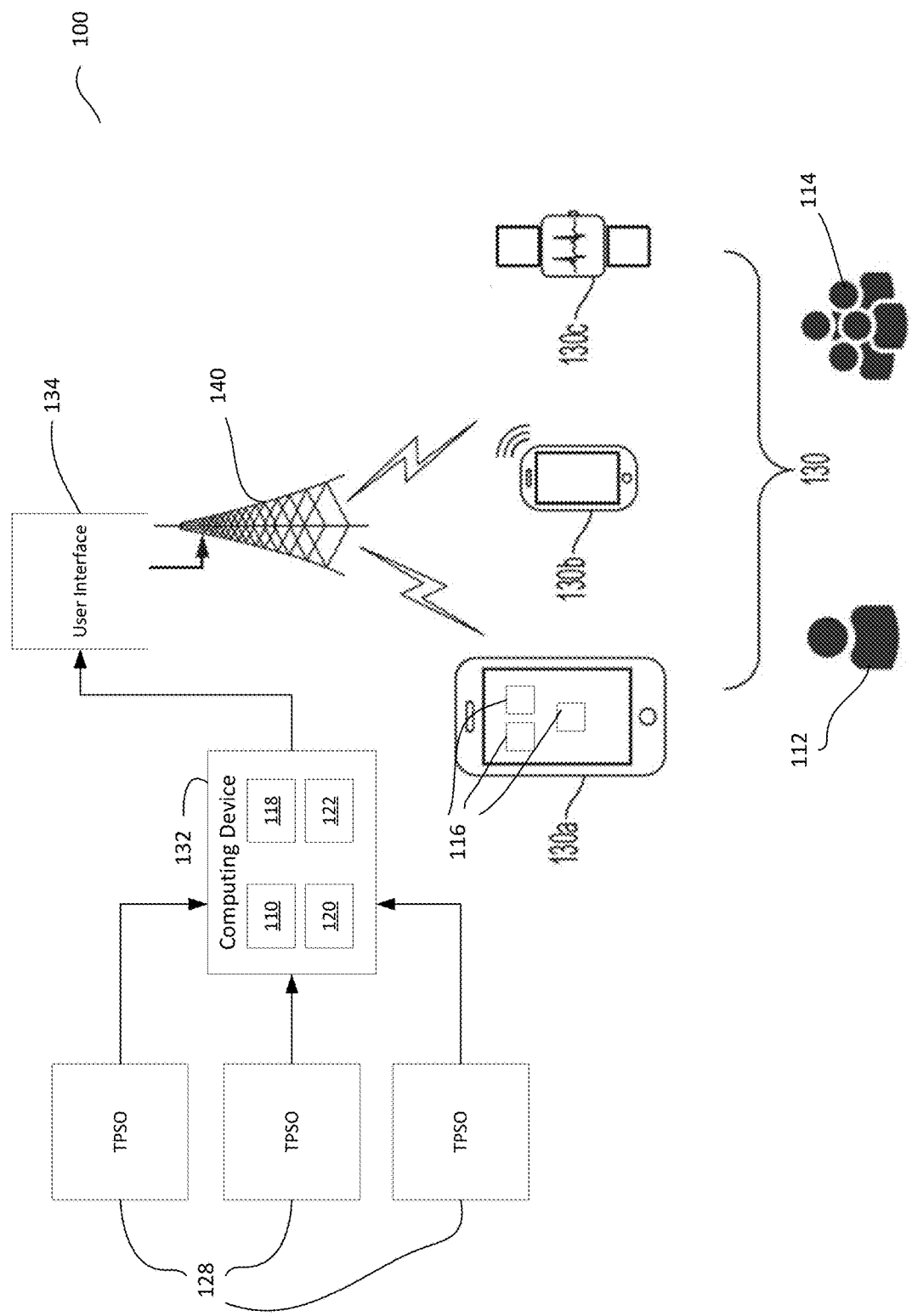
FIG. 1 is a schematic of a server operator environment for automatically populating graphical elements on a user interface according to one example of the present disclosure.

FIG. 1 is a schematic of a server operator environment 100 for automatically populating graphical elements 116 on a user interface 134 according to one example of the present disclosure. Included in the server operator environment are a specific user 112, a plurality of users 114, one or more user devices 130, one or more communication networks 140, a user interface 134, a computing device 132, and a plurality of third-party server operators 128. The one or more user devices 130 may send or receive communication with the computing device 132 over the one or more communication networks 140. The one or more communication networks 140 may correspond to one or more Wide Area Networks ("WANs"), such as the Internet, through which the one or more user devices 130 and the computing device 132 may communicate with servers via web browsers or client-side applications, to establish communication sessions, request and receive web-based resources, and access other features of applications or services.

The one or more user devices 130, which can include suitable devices for accessing web-based resources or application-based resources, can be capable of accessing and establishing communication sessions with the computing device 132 through the one or more communication networks 140. As illustrated in FIG. 1, portable devices 130a-130c correspond to mobile devices, including tablet computers 130a, smartphones 130b, and smart watches 130c, which may access the computing device 132 via a Local Area Network ("LAN") or Wide Area Network ("WAN"), as well as mobile telecommunication networks, short-range wireless networks, or various other communication network types (e.g., cable or satellite networks).

The computing device 132 can receive sets of information 110 from the plurality of third-party server operators 128. The computing device 132 can create, for each set of information, graphical elements 116 to include on the user interface 134. The graphical elements 116 can include several graphical element types including images, animated images such as gifs, internet links, texts, videos, audio elements, or some combination thereof. The graphical elements 116 can be displayed within a centralized offer webpage associated with the user interface 134. In some examples, the graphical elements 116 can be embedded within other webpages associated with the user interface 134. For example, the graphical elements 116 can be embedded within a transaction list displayed for a user account. A graphical element can be displayed near an associated transaction in the transaction list. The computing device 132 can transmit the user interface 134 to the one or more user devices 130 through the one or more communication networks 140. The plurality of users 114 can use the one or more user devices 130 to relay a first set of data 118 to the computing device 132 via the user interface 134.

The computing device 132 can include a machine-learning (ML) model 120. The computing device 132 can train the ML model 120 to determine at least one pattern in activities using the first set of data 118. The computing device 132 can collect, via the user interface 134, a second set of data 122, from the specific user 112 by means of the one or more user devices 130. The computing device 132 can apply the ML model 120 to the second set of data 122 to predict a pattern of activities associated with the specific user 112.

The computing device 132 can automatically populate the user interface 134 with at least one graphical element based on the pattern of activities associated with the specific user 112. The pattern of activities predicted by the ML model 120 can include spending habits, frequency of transactions, transaction categories, a timeline for predicted expenditures, an evolving list of graphical element categories to associate with the specific user 112, etc. For example, the second set of data 122 can reveal that the specific user 112 is recently married and without children. The list of graphical element categories can include categories associated with gift purchases for the spouse of the specific user 112. The list of graphical element categories can evolve to eventually include products for toddlers such as infant clothes and toys.

The pattern of activities predicted by the ML model 120 can be based on personal information associated with specific user 112. For example, the specific user 112 may be an elementary school teacher. The pattern of activities can include purchasing additional school supplies for students periodically. The computing device 132 can embed graphical elements 116 related to school supplies near entries for school supply purchases on a transaction page of the user interface 134. The user interface is discussed further below with respect to FIG. 4.

Additionally, the pattern of activities predicted by the ML model 120 can include vacation trips during the summer. The computing device 132 can populate the user interface 134 with graphical elements 116 related to vacation spots during the spring months when the specific user 112 may plan the vacation trips. The second set of data 122 can include a list of favorite vacation spots of the specific user 112.

Figure 2:
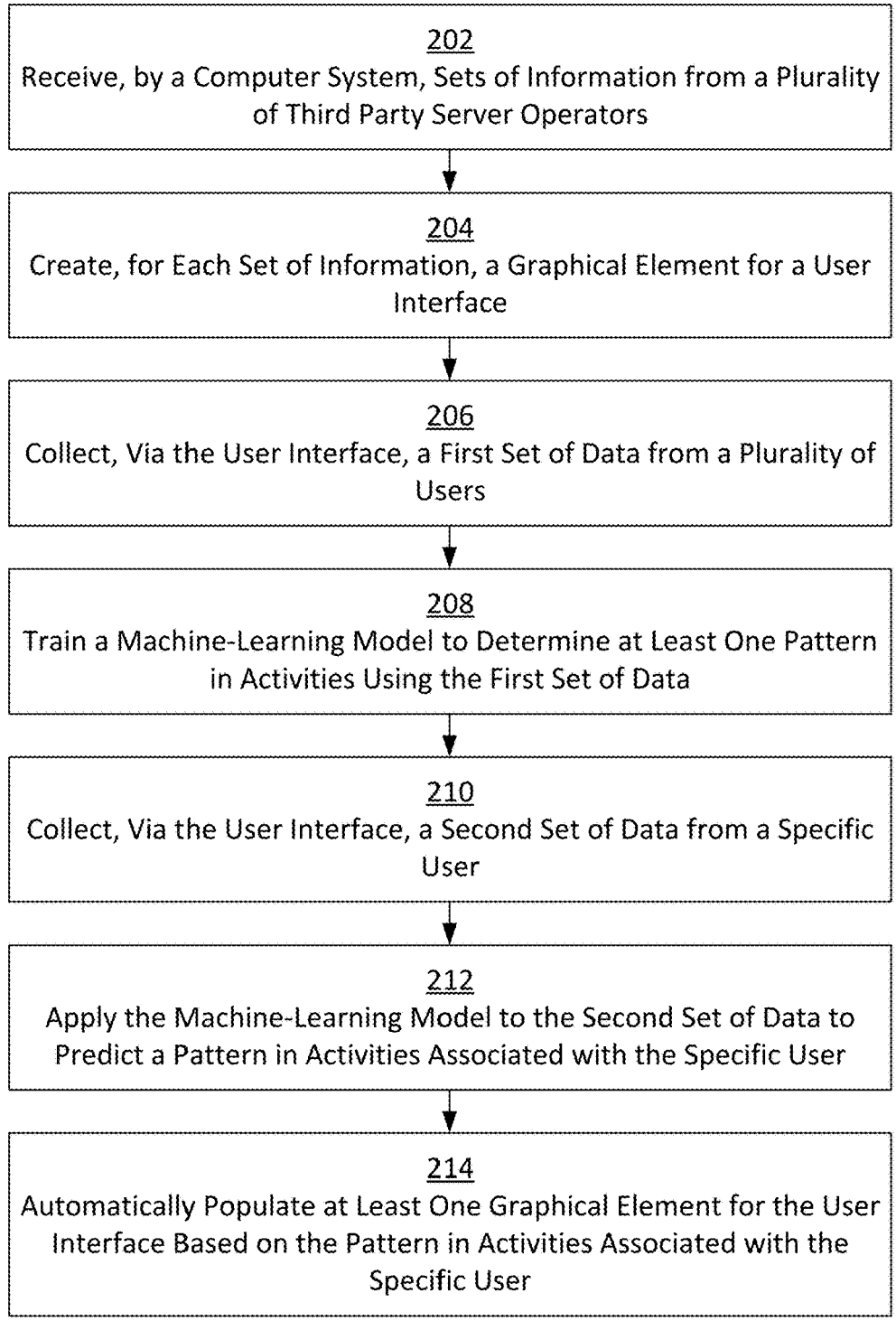
FIG. 2 is a flowchart of a process for automatically populating graphical elements on a user interface according to one example of the present disclosure.

FIG. 2 is a flowchart of a process 200 for automatically populating graphical elements 116 on a user interface 134 according to one example of the present disclosure. Operations of flowcharts may be performed by software, firmware, hardware, or a combination thereof. At block 202, the process 200 involves receiving, by a computing device 132, sets of information 110 from a plurality of third-party server operators 128. The sets of information can include services that the plurality of third-party server operators 128 wish to provide users. In some examples, the sets of information 110 can include information related to the server operator associated with the computing device 132. In some examples, the computing device 132 can receive an amount of payment from each third-party server operator of the plurality of third-party server operators 128.

At block 204, the process 200 involves creating, for each set of information, a graphical element for the user interface 134. Graphical elements 116 can include several graphical element types including images, animated images such as gifs, internet links, texts, videos, audio elements, or some combination thereof. Graphical elements 116 can be characterized by graphical element categories. For instance, a particular graphical element can indicate that a particular third-party server offers lodging services in a particular geographic region. In this example, the graphical element would fall under the graphical element category of 'travel services.' Examples of categories can include leisure services, entertainment services, recreation services, grocery services, travel services, medical services, etc. Each graphical element can be associated with more than one graphical element category. Two graphical elements from two different third-party server operators can be related when the two graphical elements are characterized by the same graphical element category (or the same categories).

At block 206, the process 200 involves collecting, via the user interface 134, a first set of data 118 from a plurality of users 114. The first set of data 118 can include answers to questions posed by the computing device 132, personalized data associated with each user of the plurality of users 114, a historical record of the graphical elements 116 usage by each user, user payment transaction information, etc. The historical record of graphical elements 312 usage can include frequency of use for each graphical element selected, a time of day for each use, a calendar date for each use, etc. Personalized data can include geographic location, age, gender, occupation, salary range, favorite movie genre, etc.

In some examples, the computing device 132 may use a portion of the first set of data to determine that a user in the plurality of users is a bot user and not a human. Bots and malicious users account for a substantial number of users of user interfaces and consume valuable resources of server operators. Once a user is identified as a bot user, the computing device 132 can block the bot user from accessing the user interface 134 and data received from the bot user can be expunged from the first set of data 314.

At block 208, the process 200 involves training the ML model 120 to determine at least one pattern in activities using the first set of data 118. In some examples, determining at least one pattern in activities can include identifying a correlation between subsets of the first set of data 118 and a likelihood of selecting a particular graphical element. For example, the ML model can be trained to recognize that a user who has an academic occupation is much more likely to select an graphical element with a category of travel services/leisure services in July than in January.

At block 210, the process 200 involves collecting, via the user interface 134, a second set of data 122 from a specific user 112. The specific user 112 can be a first-time user of the user interface 134. The second set of data 122 can include answers to questions posed by the computing device 132, user payment transaction information, personalized data associated with the specific user 112, a historical record of the graphical elements 312 usage by the specific user 112 (if applicable), data (e.g., time of day, calendar date) associated with the current access of the user interface 134, etc. In some examples, the computing device 132 can use the second set of data 122 to confirm that the specific user 112 is a human and not a bot user. In some examples, the computing device 132 can quantify interests of the specific user in the graphical element categories based on the answers to the questions posed by the computing device 132.

At block 212, the process 200 involves applying the ML model 120 to the second set of data 122 to predict a pattern in activities associated with the specific user 112. In some examples, the ML model 316 can rank graphical elements 116 based on the pattern in activities associated with the specific user 112. The ML model 120 can also identify categories of graphical elements 116 that will have a high probability of selection by the specific user 112.

At block 214, the process 200 involves automatically populating at least one graphical element for the user interface 134 based on the pattern in activities associated with the specific user 112. The at least one graphical element can be arranged in such a way that graphical elements that have a high probability of selection by the specific user 112 are highlighted. For example, the graphical elements can be displayed top to bottom on a webpage in order based on rank received by the ML model 120.

In some examples, automatically populating the at least one graphical element can include populating a centralized offer webpage with the at least one graphical element. A use of the at least one graphical element by the specific user can be recorded and an effectiveness of the centralized offer webpage can be assessed based on the recorded use. For example, graphical element use data can be recorded by the computing device 132 to help determine which factors impact in graphical element selection for the centralized offer webpage. The graphical element use data can include factor such as the time of day that the graphical element was used, a user device associated with the use, the category for the selected graphical element, the type (e.g., image) of graphical element used, a number of times that the user was shown the graphical element before the graphical element was used, a calendar date for the use, location of the graphical element on the centralized offer webpage when the graphical element was used, etc. The computing device can analyze graphical element use data from a plurality of users to determine which factors have the most impact in graphical element selection for the centralized offer webpage.

In some examples, automatically populating the at least one graphical element can include identifying at least two related graphical elements from the at least one graphical element and posting a side-by-side comparison of the at least two related graphical elements on the centralized offer webpage. Two graphical elements can be related when they are categorized by the same category (or categories).

For example, for a specific user 112, graphical elements with the categories travel services and leisure services can have a high probability of selection by the specific user 112. Two graphical elements associated with two third-party server operators can describe lodging services at a popular resort. In this example, the two graphical elements are categorized under travel services and leisure services. The side-by-side comparison of the two graphical elements can be displayed for the specific user 112 on the centralized offer webpage.

In some examples, automatically populating the at least one graphical element can include embedding the at least one graphical element. An embedded graphical element can be a graphical element included in other webpages associated with the user interface 134 visited by the specific user 112. For example, the at least one graphical element can be displayed within a transaction list shown on a webpage associated with an account of the specific user 112. The embedded graphical element can be displayed within the list based on a history of payment transactions for the specific user 112. For example, a graphical element that highlights a new brand of coffee available in grocery stores can be embedded in the transaction list right below the most recent grocery store transaction displayed in the transaction list.

In some examples, automatically populating the at least one graphical element can include pushing a notification to a 'lock-screen' of the at least one user device 130. The notification can include at least one recommendation based on the second set of data 122. For example, the computing device 132 can recognize that the specific user 112 has a strong tendency to make grocery purchases based on a transaction history for the specific user 112 or based on a quantified interest in a grocery graphical element category determined by the computing device 132. The notification pushed by the computing device 132 to the 'lock-screen' can indicate potential savings when a particular rewards card is used on grocery purchases. In some examples, the computing device 132 can calculate a yearly amount spent on groceries by the specific user 112. The potential savings in the notification can include a calculated value for an amount the specific user 112 would save in a year when the particular rewards card is used on grocery purchases. The computing device 132 can recommend different rewards cards for each graphical element category to maximize savings for the specific user 112.

Figure 3:
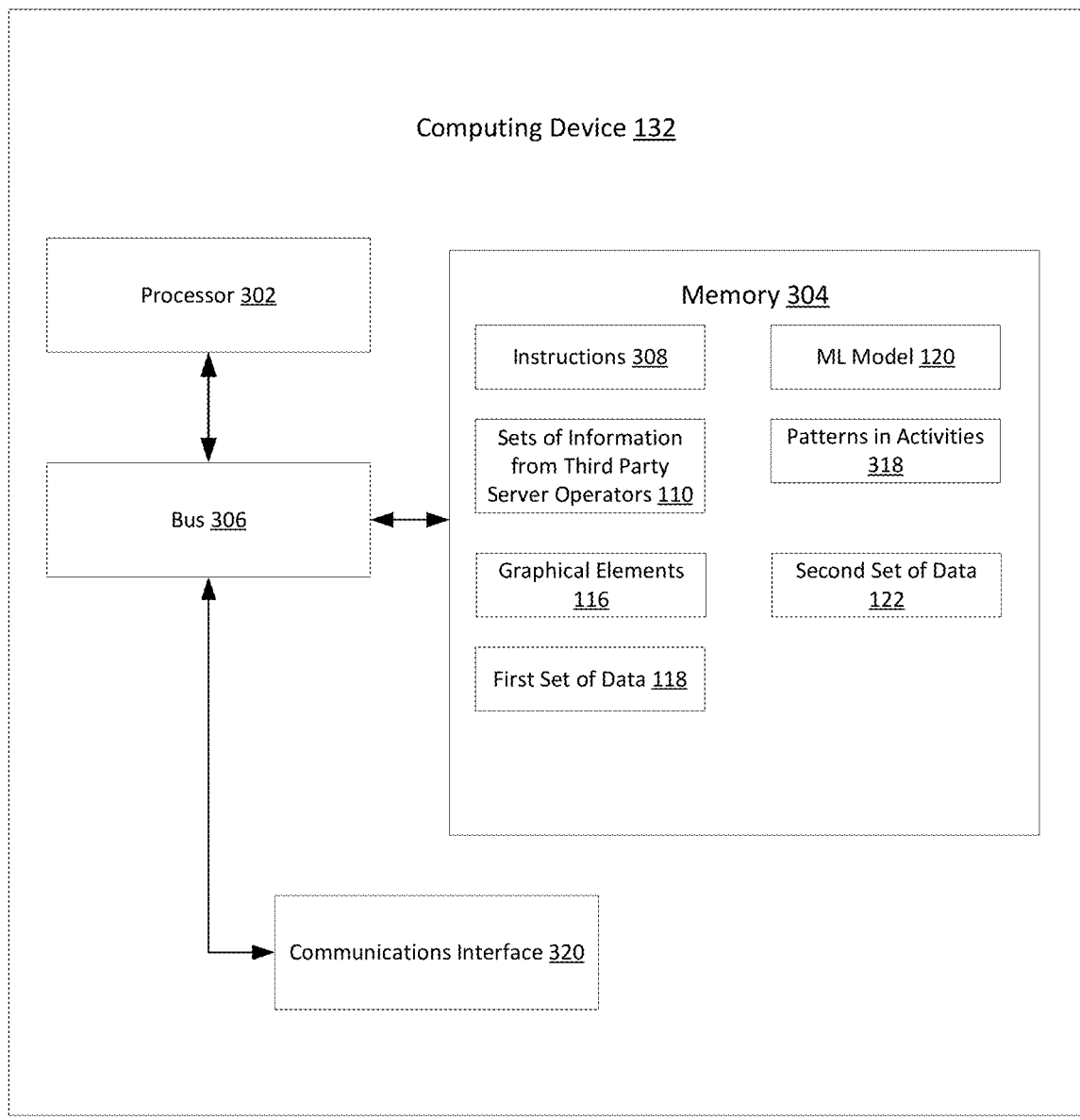
FIG. 3 is a block diagram of an example of a computing device for automatically populating graphical elements on a user interface according to one example of the present disclosure.

FIG. 3 is a block diagram of an example of a computing device 132 for automatically populating graphical elements 116 on a user interface 134 according to one example of the present disclosure. The components in FIG. 3, such as a processor 302, a memory 304, a bus 306, and the like, may be integrated into a single structure such as within a single housing of the computing device 132. Alternatively, the components shown in FIG. 3 can be distributed from one another and in electrical communication with each other.

As shown, the computing device 132 includes the processor 302 communicatively coupled to the memory 304 by the bus 306. The processor 302 can include one processor or multiple processors. Non-limiting examples of the processor 302 include a Field-Programmable Gate Array (FPGA), an application specific integrated circuit (ASIC), a microprocessor, or any combination of these. The processor 302 can execute instructions 308 stored in the memory 304 to perform operations. In some examples, the instructions 308 stored in the memory 304 can include processor-specific instructions generated by a compiler or an interpreter from code written in any suitable computer-programming language, such as C, C++, C #, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any type of non-volatile memory. At least some of the memory 304 can include a non-transitory computer-readable medium from which the processor 302 can read the instructions 308. The non-transitory computer-readable medium can include electronic, optical, magnetic, or other storage devices capable of providing the processor 302 with the instructions 308 or other program code. Non-limiting examples of the non-transitory computer-readable medium include magnetic disk(s), memory chip(s), RAM, an ASIC, or any other medium from which a computer processor can read instructions.

The computing device 132 also includes the bus 306 (e.g., PCI, ISA, PCI-Express, Hyper-Transport® bus, Infini-Band® bus, NuBus, etc.) and a communications interface 320 (e.g., a FiberChannel Interface, wireless interface, etc.).

Realizations may include fewer or additional components not illustrated in FIG. 3 (e.g., video cards, audio cards, additional communication interfaces, peripheral devices, etc.). The processor 302 and the communication interface 320 are coupled to the bus 306. Although illustrated as being coupled to the bus 306, the memory 304 may be coupled to the processor 302.

Additionally, the memory 304 can include sets of information 110 from third-party server operators, graphical elements 116, a first set of data 118, an ML model 120, patterns in activities 318, and a second set of data 122. The computing device 132 can receive the sets of information 110 from a plurality of third-party server operators 128. In some examples, information from the server operator associated with the computing device can be included in the sets of information. The graphical elements 116 can be created for each set of information.

The computing device 132 can receive the first set of data 118 from a plurality of users 114. The first set of data 118 can be used to train the ML model 120 to determine patterns in activities 318. Additionally, the computing device can receive a second set of data 122 from a specific user 112. The ML model 120 can be applied to the second set of data 122 to predict a pattern in activities associated with the specific user 112. The computing device 132 can automatically populate at least one graphical element for the user interface 134 based on the pattern in activities associated with the specific user 112.

Figure 4:
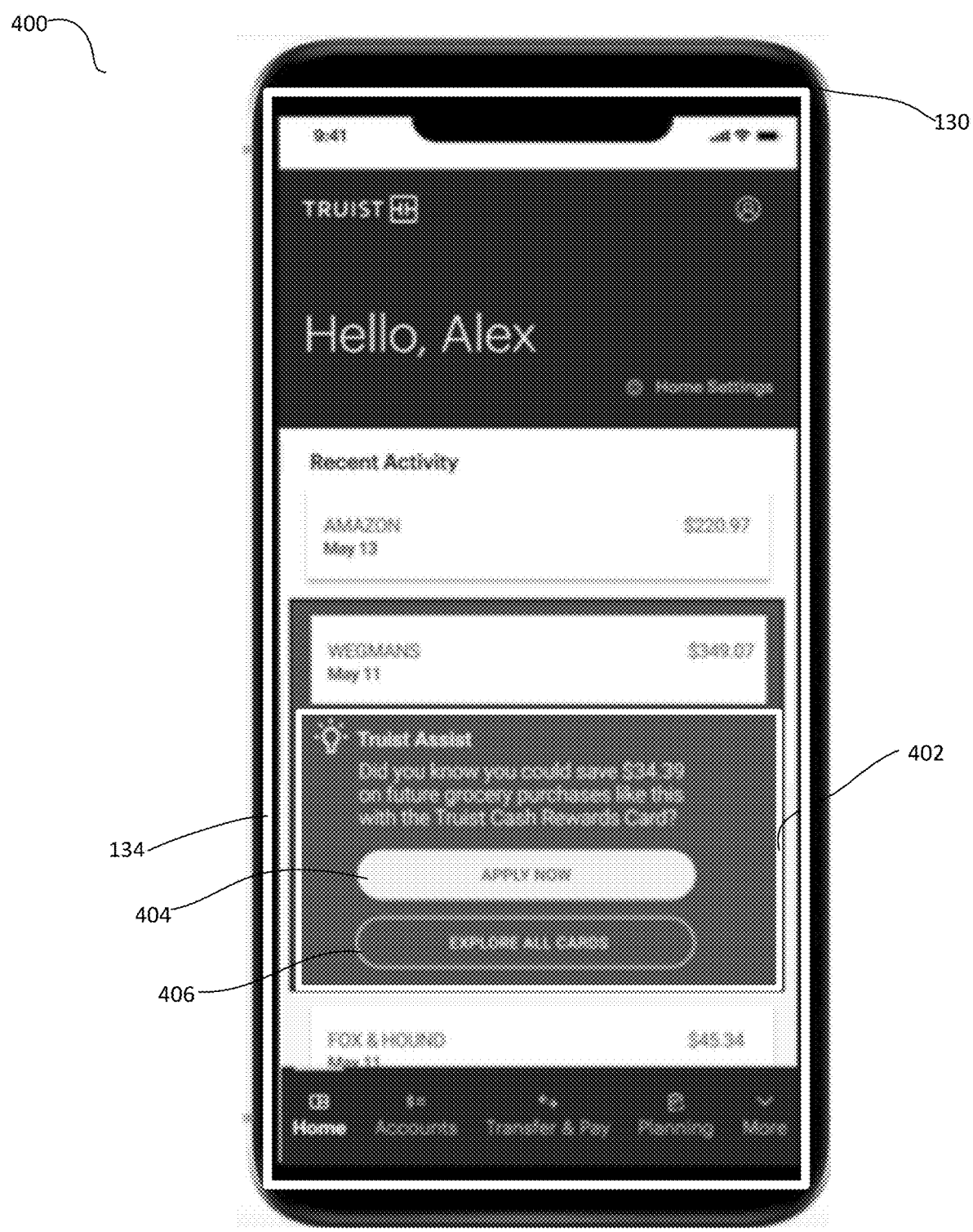
FIG. 4 is an illustration of an example user interface on a user advice that can include automatically populated graphical elements according to one example of the present disclosure.

FIG. 4 is an illustration 400 of an example user interface 134 on a user device 130 that can include automatically populated graphical elements according to one example of the present disclosure. The illustration 400 includes an embedded graphical element 402. The embedded graphical element 402 is included in a list of transactions on the user interface 134. The embedded graphical element 402 is placed right below a grocery purchase in the list of transactions and includes text indicating potential savings for a specific user 112 if the specific user were to use a particular rewards card on future grocery purchases.

The illustration 400 shows that the embedded graphical element 402 also includes two links in the form of an 'apply now' button 404 and an 'explore all cards' button 406. The 'apply now' button 404 can, for example, lead to a webpage that allows the specific user 112 to sign up for the rewards card associated with the potential savings listed in the embedded graphical element 402. The 'explore all cards' button 406 can, for example, lead to a webpage that can include a side-by-side comparison of the rewards card associated with the potential savings with other potential cards that can also provide potential savings on future purchases.

In some examples, the graphical element 402 can include at least one recommendation based on transactions depicted in the user interface 134. For example, the computing device 132 can recognize that the specific user 112 has a strong tendency to make grocery purchases based on a transaction history for the specific user 112 or based on a quantified interest in a grocery graphical element category determined by the computing device 132. The graphical element 402 can indicate potential savings when a particular rewards card is used on grocery purchases or any other types of transactions displayed in the user interface 134. In some examples, the computing device 132 can calculate a yearly amount spent on groceries by the specific user 112. The graphical element 402 can include a calculated value for an amount the specific user 112 would save in a year when the particular rewards card is used on grocery purchases. Further, the graphical element 402 can display different rewards cards for each transaction category to maximize savings for the specific user 112.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method of automatically populating graphical elements on a user interface of a computer system comprising:
receiving, by the computer system, sets of information from a plurality of third-party server operators, the sets of information comprising one or more services provided by the plurality of third-party server operators;
creating, for each set of information, a graphical element for the user interface, the graphical element indicating at least one service provided in a respective set of information received from the plurality of third-party operators;
collecting, via the user interface, a first set of data from a plurality of users;
training a machine-learning model to determine at least one pattern in activities using the first set of data;
collecting, via the user interface, a second set of data from a specific user;
applying the machine-learning model to the second set of data to predict a pattern in activities associated with the specific user, wherein the predicted pattern comprises an evolving list of graphical element categories to associate with a marital, parental, or career status of the specific user;
generating, by the machine-learning model, a ranking of a set of potential graphical elements based on the predicted pattern; and
automatically populating at least two graphical elements from the set of potential graphical elements for the user interface based on the pattern in activities associated with the specific user and arranging the at least two graphical elements in order from a top towards a bottom of the user interface based on the ranking generated by the machine-learning model.

2. The method of claim 1, wherein automatically populating the at least two graphical elements comprises populating a centralized offer webpage with the at least two graphical elements.

3. The method of claim 2, further comprising:
identifying at least two related graphical elements from the at least two graphical elements; and
posting a side-by-side comparison of the at least two related graphical elements on the centralized offer webpage.

4. The method of claim 2, further comprising:
collecting graphical element use data associated with a use of at least one graphical element by the specific user; and
determining which factors impact graphical element selection for the centralized offer webpage.

5. The method of claim 4, wherein the graphical element use data comprises at least one of a time of day, a graphical element type, a graphical element category, or a location of the at least one graphical element on the centralized offer webpage.

6. The method of claim 1, wherein the first set of data and the second set of data comprise payment transaction information.

7. The method of claim 1, wherein automatically populating the at least two graphical elements comprises embedding, based on a history of payment transactions for the specific user, at least one graphical element within a transaction list.

8. A computer system for automatically populating graphical elements on a user interface comprising:
a processor; and
a memory that includes instructions executable by the processor for causing the processor to perform operations comprising:
receiving sets of information from a plurality of third-party server operators, the sets of information comprising one or more services provided by the plurality of third-party server operators;
creating, for each set of information, a graphical element for the user interface, the graphical element indicating at least one service provided in a respective set of information received from the plurality of third-party operators;
collecting, via the user interface, a first set of data from a plurality of users;
training a machine-learning model to determine at least one pattern in activities using the first set of data;
collecting, via the user interface, a second set of data from a specific user;
applying the machine-learning model to the second set of data to predict a pattern in activities associated with the specific user, wherein the predicted pattern comprises an evolving list of graphical element categories to associate with a marital, parental, or career status of the specific user;
generating, by the machine-learning model, a ranking of a set of potential graphical elements based on the predicted pattern; and
automatically populating at least two graphical elements from the set of potential graphical elements for the user interface based on the pattern in activities associated with the specific user and arranging the at least two graphical elements in order from a top towards a bottom of the user interface based on the ranking generated by the machine-learning model.

9. The computer system of claim 8, wherein automatically populating the at least two graphical elements comprises populating a centralized offer webpage with the at least two graphical elements.

10. The computer system of claim 9, wherein the operations further comprise:
identifying at least two related graphical elements from the at least two graphical elements; and
posting a side-by-side comparison of the at least two related graphical elements on the centralized offer webpage.

11. The computer system of claim 9, wherein the operations further comprise:
collecting graphical element use data associated with a use of at least one graphical element by the specific user; and
determining which factors impact graphical element selection for the centralized offer webpage.

12. The computer system of claim 11, wherein the graphical element use data comprises at least one of a time of day, a graphical element type, a graphical element category, or a location of the at least one graphical element on the centralized offer webpage.

13. The computer system of claim 8, wherein the first set of data and the second set of data comprise payment transaction information.

14. The computer system of claim 8, wherein automatically populating the at least two graphical elements comprises embedding, based on a history of payment transactions for the specific user, at least one graphical element within a transaction list.

15. A non-transitory computer-readable medium comprising instructions that are executable by a processor for causing the processor to perform operations comprising:
receiving sets of information from a plurality of third-party server operators, the sets of information comprising one or more services provided by the plurality of third-party server operators;
creating, for each set of information, a graphical element for a user interface, the graphical element indicating at least one service provided in a respective set of information received from the plurality of third-party operators;
collecting, via the user interface, a first set of data from a plurality of users;
training a machine-learning model to determine at least one pattern in activities using the first set of data;
collecting, via the user interface, a second set of data from a specific user;
applying the machine-learning model to the second set of data to predict a pattern in activities associated with the specific user, wherein the predicted pattern comprises an evolving list of graphical element categories to associate with a marital, parental, or career status of the specific user;
generating, by the machine-learning model, a ranking of a set of potential graphical elements based on the predicted pattern; and
automatically populating at least two graphical elements from the set of potential graphical elements for the user interface based on the pattern in activities associated with the specific user and arranging the at least two graphical elements in order from a top towards a bottom of the user interface based on the ranking generated by the machine-learning model.

16. The non-transitory computer-readable medium of claim 15, wherein automatically populating the at least two graphical elements comprises populating a centralized offer webpage with at least one graphical element.

17. The non-transitory computer-readable medium of claim 16, wherein the operations further comprise:
identifying at least two related graphical elements from the at least two graphical elements; and
posting a side-by-side comparison of the at least two related graphical elements on the centralized offer webpage.

18. The non-transitory computer-readable medium of claim 16, wherein the operations further comprise:
collecting graphical element use data associated with a use of at least one graphical element by the specific user; and
determining which factors impact graphical element selection for the centralized offer webpage.

19. The non-transitory computer-readable medium of claim 18, wherein the graphical element use data comprises at least one of a time of day, a graphical element type, graphical element category, or a location of the at least one graphical element on the centralized offer webpage.

20. The non-transitory computer-readable medium of claim 15, wherein automatically populating the at least two graphical elements comprises embedding, based on a history of payment transactions for the specific user, at least one graphical element within a transaction list.

* * * * *